United States Patent [19]
Meisner

[11] Patent Number: 5,990,652
[45] Date of Patent: Nov. 23, 1999

[54] SWING SYSTEM FOR A SURFACE MINING SHOVEL

[75] Inventor: Charles J. Meisner, Waukesha, Wis.

[73] Assignee: Harnischfeger Technologies, Inc., Wilmington, Del.

[21] Appl. No.: 08/743,607

[22] Filed: Nov. 4, 1996

[51] Int. Cl.$^6$ .......................... G05B 11/01; H02K 41/00
[52] U.S. Cl. ................ 318/687; 318/630; 318/648; 310/12
[58] Field of Search ..................... 318/568–690, 318/800–818; 310/12; 104/23.2, 282, 284; 89/46, 47, 36 K, 41 M

[56] References Cited

U.S. PATENT DOCUMENTS

| | | | |
|---|---|---|---|
| 4,382,216 | 5/1983 | Joseph | 318/630 |
| 4,444,089 | 4/1984 | Pietzsch et al. | 89/36 K |
| 4,536,690 | 8/1985 | Belsterling et al. | 318/687 |
| 4,603,640 | 8/1986 | Miller et al. | 104/282 |
| 4,640,181 | 2/1987 | Schiele et al. | 89/46 |
| 4,908,558 | 3/1990 | Lordo et al. | 318/648 |
| 5,668,421 | 9/1997 | Gladish | 310/12 |

*Primary Examiner*—Paul Ip
*Attorney, Agent, or Firm*—Richard C. Ruppin

[57] ABSTRACT

A swing drive system for a surface mining shovel comprising an alternating current motor having a plurality of distributed rotor coils mounted on the lower body and a plurality of distributed stator coils connected to a power supply and mounted on the upper frame. Operation of the motor causes the upper body to rotate or swing relative to the stationary lower body. The rotatable upper frame and thereby the stator coils are movably supported on a circular track forming part of the lower stationary body by means of rollers positioned between the upper frame and the lower body. The upper frame may have a circular track facing the lower track and the rollers then roll on the lower circular track in engagement with both the upper and lower circular tracks to rotatably support the upper frame on the lower body. The rotor coils are preferably positioned between the rollers and the stator coils. The motor is supplied with three phase A.C. power from an inverter such that the frequency of the power to the motor can be adjusted to control the speed of the motor. The motor and thereby the swing of the rotatable upper frame can be stopped by controlling the inverter to change the sequence of two of the three phases of the power supplied by the inverter.

13 Claims, 5 Drawing Sheets

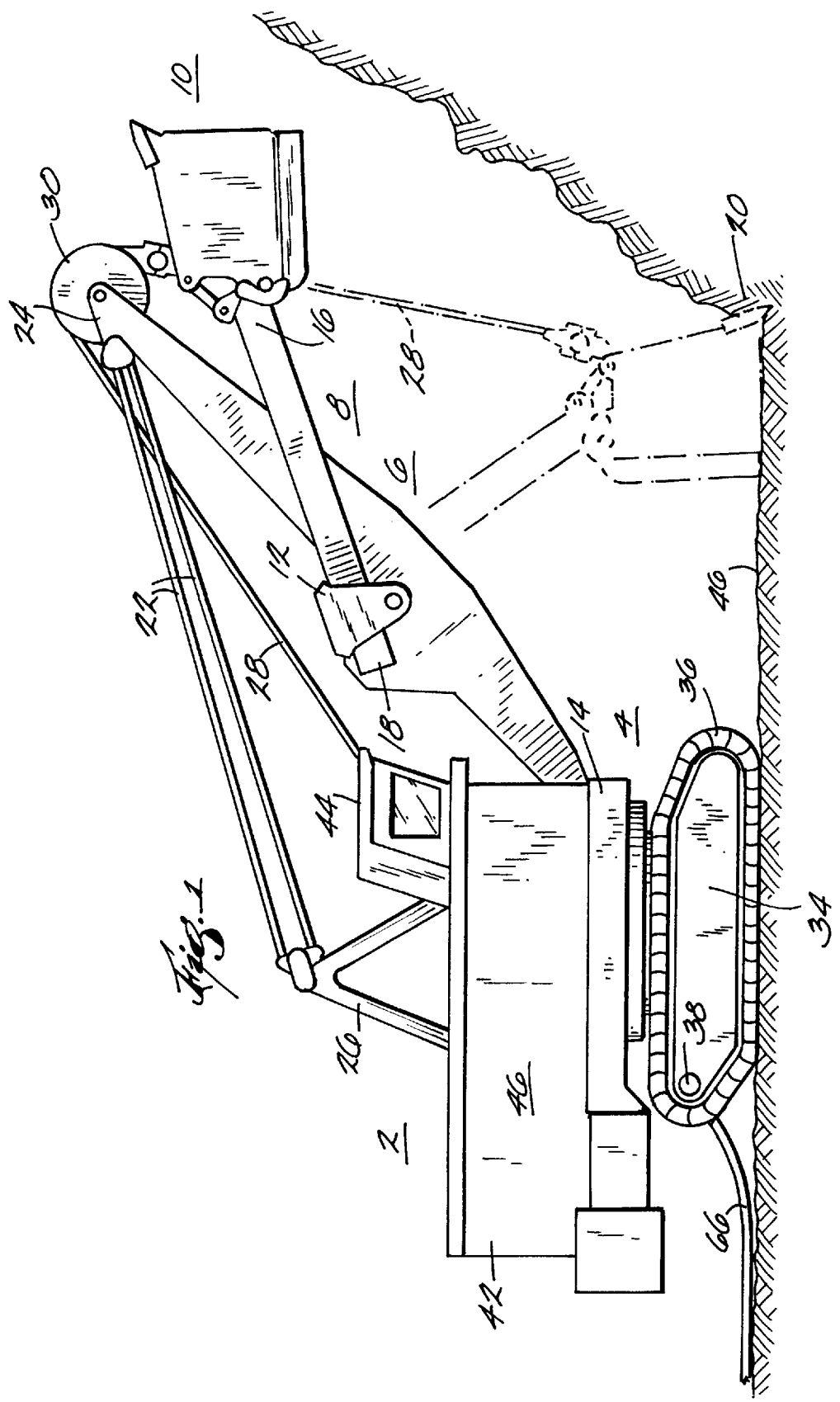

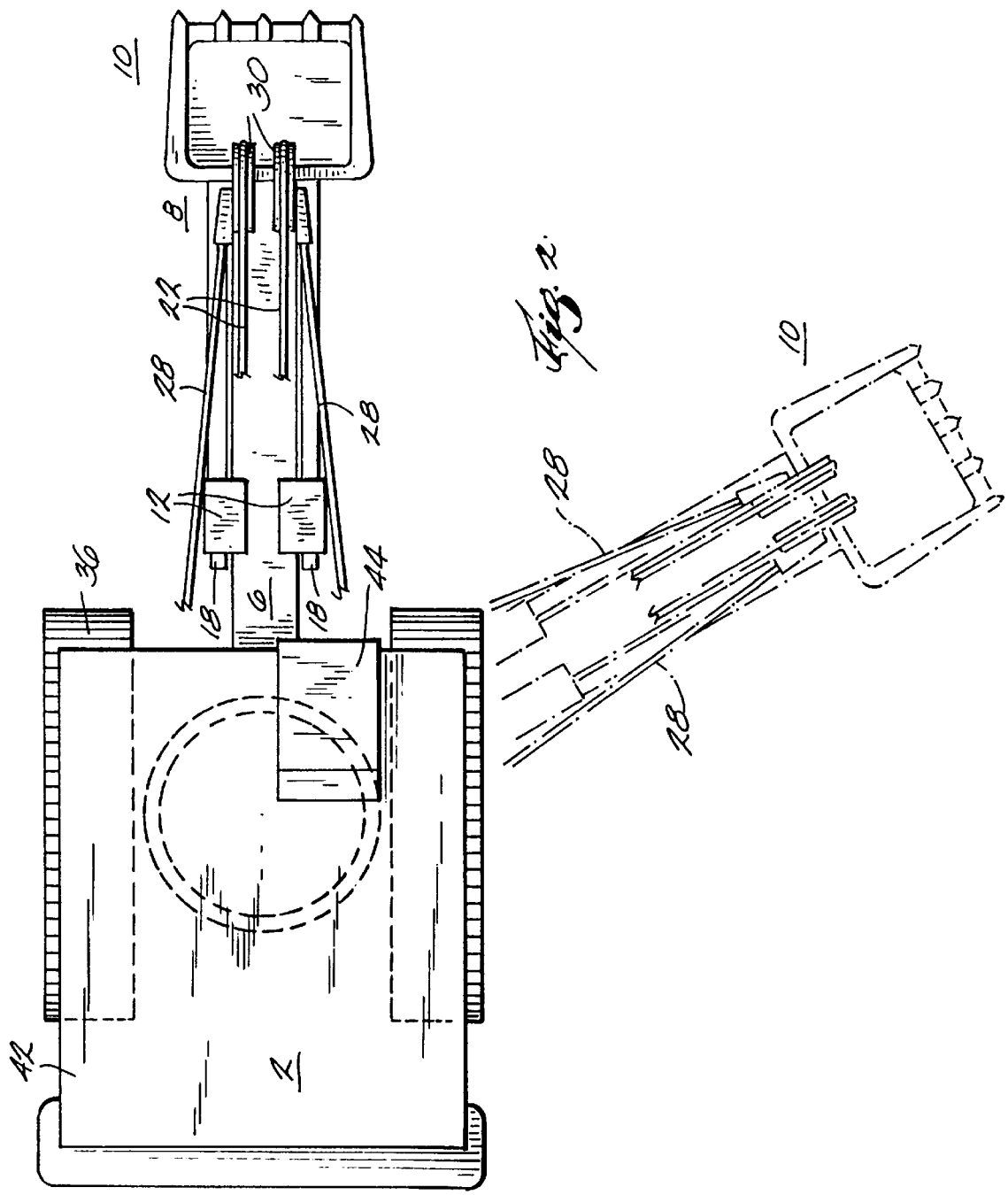

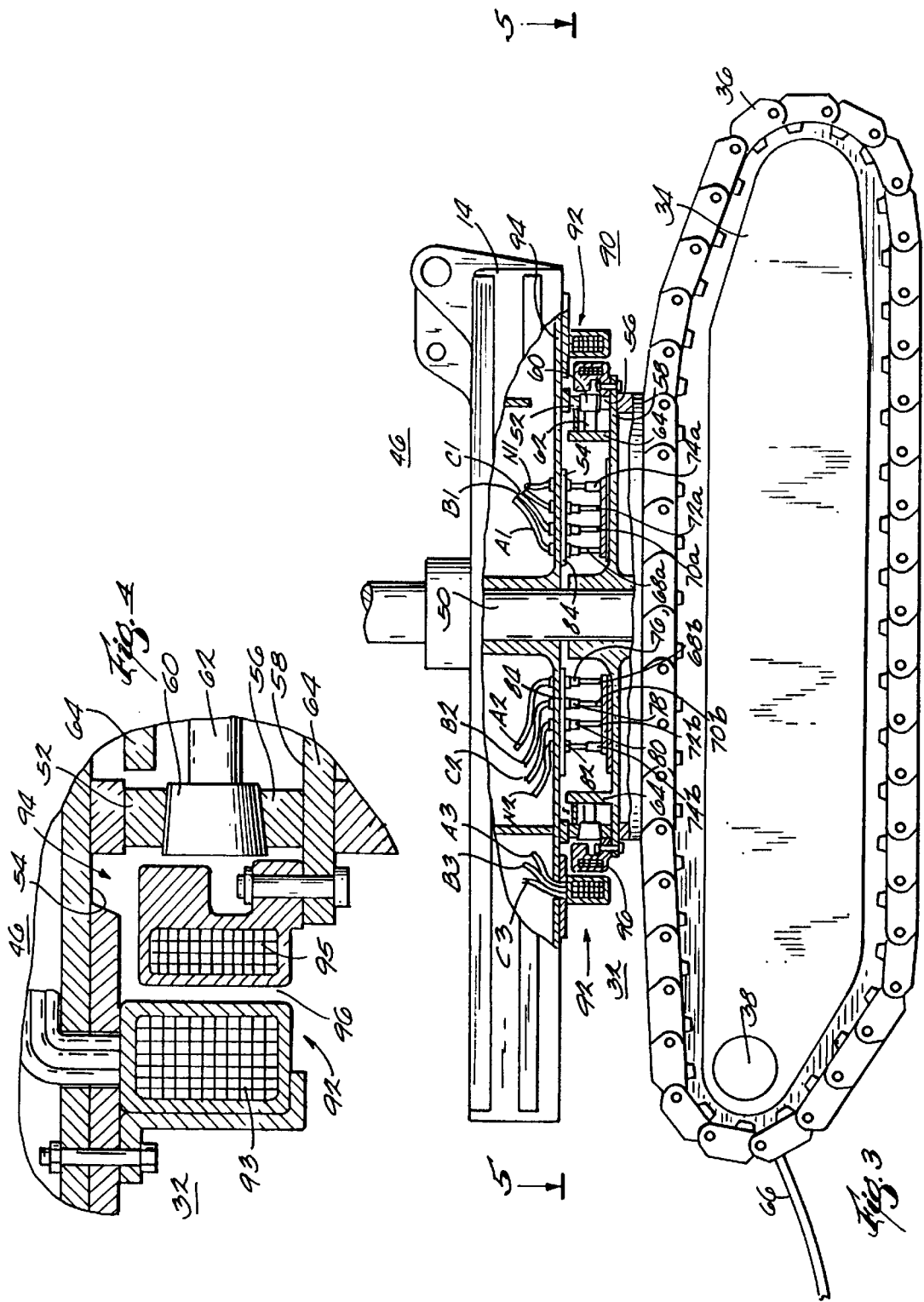

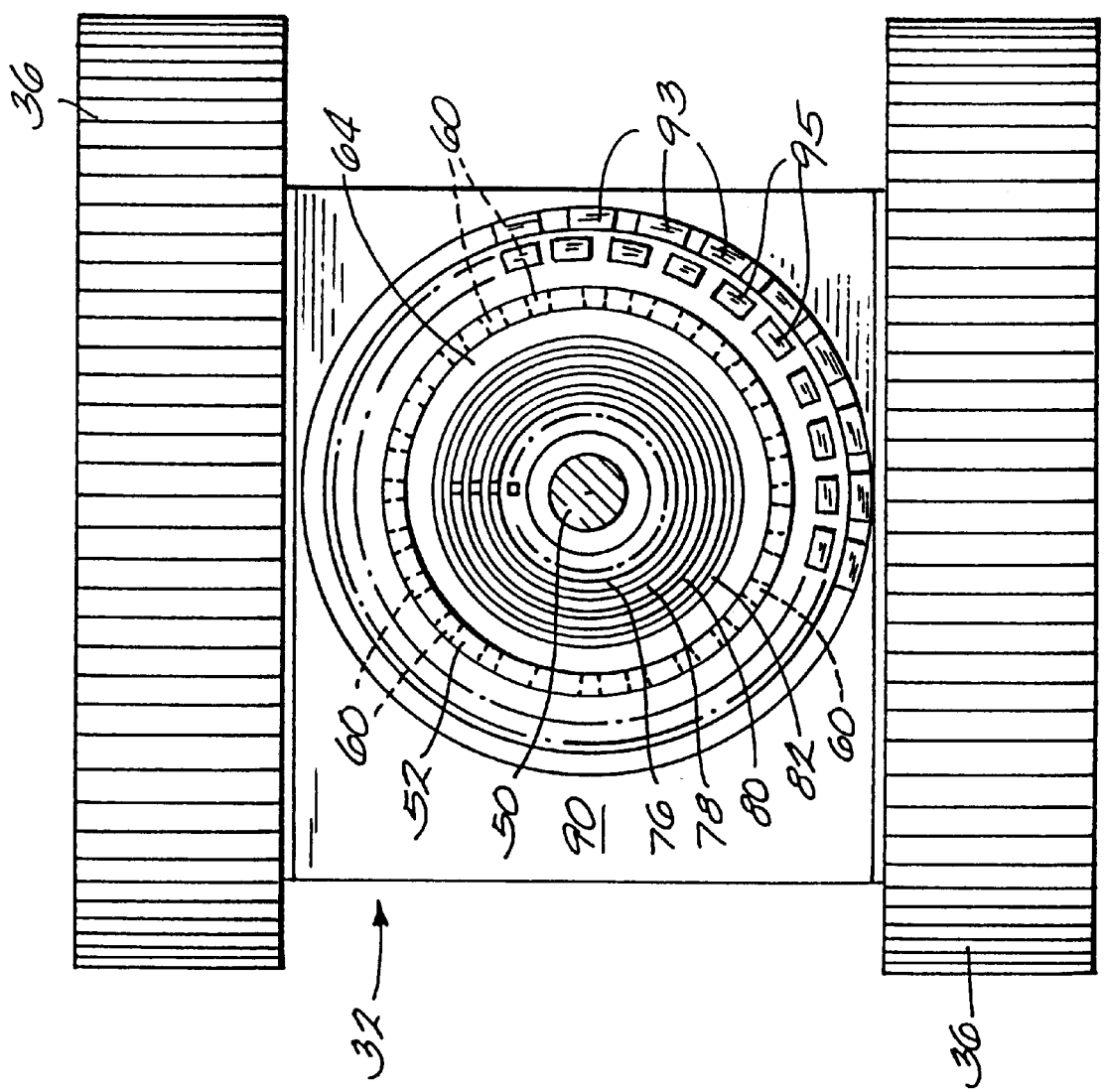

SWING SYSTEM FOR A SURFACE MINING SHOVEL

FIELD OF THE INVENTION

This invention relates to a swing system for a surface mining shovel and, more particularly, to an electric motor swing system directly driving the upper rotatable assembly of a surface mining shovel.

BACKGROUND OF THE INVENTION

Modern surface mining shovels are very large and complicated equipment for digging, lifting, moving and depositing the material being mined. The various major assemblies of the shovels such as the crawler propel system, the swinging upper frame and body assembly, and the handle and dipper which are mounted for pivotal and crowd movement on the boom, are commonly driven by electric motor and gear transmission systems. Due to the need for variable speed and relatively accurate positioning of these various assemblies, the electric motors used are typically D.C. motors. The transmission systems for each of these assemblies include a variety of shafts, gears and pinion gears.

The swing drive systems for shovels are typically mounted on the upper frame and consist of several D.C. motors each driving, through a transmission for each of the motors, pinion gears extending downward from the upper frame. Each of the pinion gears engage a large swing gear mounted on a lower frame or car body which is moved along the ground by a propel system driving a continuous crawler track. The swing drives rotate or swing the upper frame on the car body which is stationary relative to the upper frame. The entire swing drive system is complex and its cost and weight contribute significantly to the overall cost and weight of the machine. There has been a long standing effort by shovel manufacturers to somehow simplify and reduce the cost and weight of swing systems.

A more recent problem relates to the high level of lubrication required by the swing system. The lubricants used in the swing system fall or drip from the various gears and shafts and this spillage of lubricant has become an environmental issue at many mines where shovels are in use.

The improved swing system of the invention disclosed herein is intended to decrease the weight and cost of the swing system and minimize the need for lubricants such as now used in swing drives.

SUMMARY OF THE INVENTION

In general, it is an object of the invention to provide a relatively simple, lighter weight, and lower cost swing drive for a surface mining shovel, having minimal environmental problems. It is also an object of this invention to provide, in a surface mining shovel, an improved swing system having an electric motor which provides direct swing drive movement to the upper assembly of the shovel. It is a further object of the invention to provide a swing motor drive for a shovel in which the motor has rotor and stator coils distributed in a circular manner respectively on the lower and upper frames of the shovel to provide a direct swing drive to the upper frame.

The invention is carried out by providing a surface mining shovel having a stationary lower body and an upper frame rotatable relative to the lower body. An alternating current (A.C.) motor is supported on the upper frame and lower body and has preferably a plurality of rotor coils mounted on the lower body and a plurality of stator coils connected to a power supply and mounted on the upper frame. Operation of the motor causes the upper body to rotate or swing relative to the stationary lower body. The rotatable upper frame and thereby the stator coils are movably supported on a circular track forming part of the lower stationary body by means of rollers positioned between the upper frame and the lower body. The upper frame may have a circular track facing the lower track and the roller means then rolls on the lower circular track in engagement with both the upper and lower circular tracks to rotatably support the upper frame on the lower body. The rotor coils are preferably positioned between the roller means and the stator coils.

The motor is supplied with three phase A.C. power from an inverter such that the frequency of the power to the motor can be adjusted to control the speed of the motor. The motor and thereby the swing of the rotatable upper frame can be stopped by controlling the inverter to change the sequence of two of the three phases of the power supplied by the inverter. The changing of the sequence of the two phases by the inverter thus acts as a brake on the motor and the rotatable upper frame.

BRIEF DESCRIPTION OF THE DRAWINGS

Further objects and advantages of the invention will appear when taken in conjunction with the accompany drawings, in which:

FIG. 1 is a side elevation view of a surface mining shovel with the dipper in a raised position shown in full lines and in a digging position shown in phantom lines;

FIG. 2. is a plan view of the surface mining shovel shown in FIG. 1 with the shovel upper assembly shown in full lines in a digging position and in phantom lines at a rotated position where material may be dumped from the dipper;

FIG. 3 is a side elevation view, partly broken away, showing the lower car body and a portion of the upper frame of the shovel shown in FIGS. 1 and 2;

FIG. 4 is an enlarged cross-sectional view of a portion of the rotating support for the upper frame of the shovel shown in FIG. 3;

FIG. 5 is a sectional view taken along lines 5—5 of FIG. 3; and

DETAILED DESCRIPTION OF THE INVENTION

Figure 6:
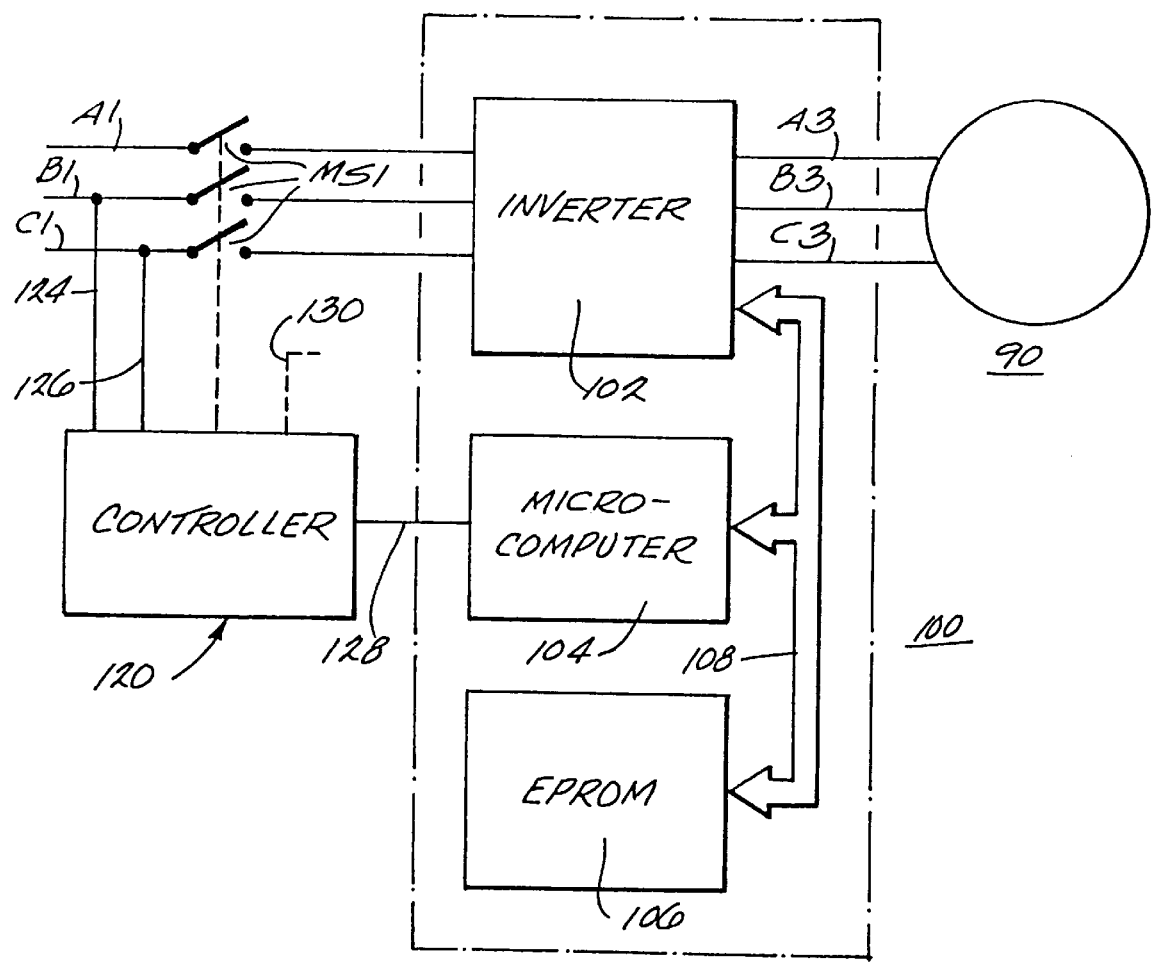
FIG. 6 is a schematic illustration of the electrical control and power supply for the shovel of the invention.

Referring generally to the drawings, a surface mining shovel is shown as having an upper assembly 2, including a machinery house 42, a lower assembly 4, a boom 6 pivotally attached to the front end 14 of the upper assembly 2, a handle 8 having a dipper 10 mounted on its outward end 16 and supported on a crowd mechanism 12 at its inward end 18. The crowd mechanism 12 is pivotally mounted on the boom 6 such that the handle 8 and dipper 10 can be raised and lowered. The crowd mechanism functions to advance the handle and thereby the dipper 10 into ground material 20 to be dug. With reference to FIG. 1, the handle and dipper are shown in a raised position in full lines and in a lowered position in phantom lines with the dipper being advanced into ground material 20 by the crowd mechanism 12. The boom 6 is supported at an angle extending upward from the upper assembly 2 by a pair of ropes 22 which are anchored to the boom point 24 and extend downward to a gantry 26 comprising part of the upper assembly 2. The dipper 10 and handle 8 are raised and lowered by a pair of ropes 28 attached to the dipper and reeved over sheaves 30 on the boom point 24. The ropes 28 then extend downward to a drum mechanism (not shown) in the machinery house 42 which can be controlled to pay out or take in the ropes 28 to raise and lower the dipper.

With reference to FIGS. 3–5 of the drawings, the lower assembly 4 includes a car body 32, a crawler frame 34, a crawler track 36 and a propel drive 38 for driving the crawler to permit movement of the shovel along the ground surface 40. The upper assembly 2 is mounted for swinging or rotating movement on the lower assembly 4 and includes, in addition to the machinery house 42 and gantry 26, an operator's cab 44 mounted on top of the machinery house 42 and an upper frame 46 on which the machinery house 42 is mounted.

A gudgeon 50 is mounted on the car body 32 and extends into the upper frame 46 for providing a vertical pivot axis for the upper assembly 2 about which the assembly 2 swings or rotates. A circular upper track 52 is mounted on a bottom surface 54 of the upper frame 46. A circular lower track 56 facing the upper track 52 is mounted on an upper surface 58 of the carbody 32. A plurality of rollers 60 are distributed along the circumferential lengths of the tracks 52 and 56 and between the tracks 52 and 56. Each of the rollers 60 is rotatably mounted on an axle 62 which, in turn, is mounted on a circular roller frame 64 affixed to the car body 32 radially inward of and adjacent to the tracks 52 and 56. The rollers 60 thus rotatably support the upper assembly 2 including the upper frame 46 and the other shovel components attached to or comprising part of the upper assembly.

Electrical three phase 60 hertz A.C. power for the operation of the shovel is supplied through a cable 66 which trails behind the shovel and contains wires or lines for each of the phases plus a neutral line. With reference to FIG. 3, one of the phase wires is connected to brushes 68a and 68b, a second one of the phase wires is connected to brushes 70a and 70b, and a third one of the phase wires is connected to brushes 72a and 72b. The neutral wire is connected to brushes 74a and 74b. All of the brushes are mounted on the carbody 32. With reference to FIGS. 3 and 5, rings 76, 78, 80 and 82 are mounted on the upper frame 46 against an electrical insulating wall 84. The brushes 68a, 68b engage ring 76, the brushes 70a, 70b engage ring 78, the brushes 72a, 72b engage ring 80 and the brushes 74a, 74b engage ring 82. The brushes maintain electrically conductive contact with the rings that they engage as the upper assembly 2 swings to thereby enable supplying of three phase power to the upper assembly 2. Phase lines A1 and A2 are connected to the ring 76, phase lines B1 and B2 are connected to ring 78, phase lines C1 and C2 are connected to ring 80, and the neutral lines N1 and N2 are connected to ring 82. The three phase lines A1 and A2, B1 and B2, and C1 and C2 and the neutrals N1 and N2 supply power to the motors and other electrical devices on the shovel including the adjustable frequency power supply 100. In turn, the power supply 100 supplies power via phase lines A3, B3 and C3 to the swing motor 90. The swing motor 90 includes a stator winding 92 mounted on the swinging upper frame 46 and a rotor winding 94 mounted on the car body 32 which is stationary relative to the upper frame 46. The stator winding 92 comprises a plurality of individual stator winding coils 93, as shown in FIG. 5, supported on the upper frame 46. The coils 93 are spaced apart and positioned along a circular path, radially outward of the tracks 52 and 56 and the rollers 60. The rotor winding 94 comprises a plurality of individual rotor winding coils 95 mounted on the car body 32 along a circular path and spaced apart from each other. As shown in FIGS. 3–5, the rotor coils 95 are positioned radially outward of the tracks 52 and 56 and radially inward of the stator coils 93, however, the rotor coils are not limited to this position and could be also mounted radially outward of the individual stator coils 93. Also, the rotor winding, rather than comprising a plurality of connected individual coils, may be of the well-known squirrel cage type. The individual stator coils 93 are wound and positioned such that a three phase rotating magnetic field is generated by the coils 93 in the air gap 96 between the stator winding 92 and the rotor winding 94. The rotor winding 94 is of the wound rotor type in which the individual coils 95 are interconnected and positioned and wound to produce a magnetic field in the air gap 96 when subjected to the magnetic field from the stator winding coils. The rotating stator field thus induces a three phase voltage and current in the rotor winding 94 and a resultant rotor magnetic field. In normal A.C. induction motor operation, a rotor magnetic field follows and attempts to move into alignment with the three phase rotating field of the stator winding to thereby rotate the rotor mechanical structure to which the rotor winding is attached. However, since the rotor winding 94 is affixed to the relatively stationary car body 32, the rotor winding 94 and car body 32 will not rotate and therefore the resultant rotor magnetic field will not follow the rotating stator magnetic field. Rather, as the stator magnetic field rotates relative to the stationary rotor winding 94, the stator magnetic field will move toward and attempt to become aligned with the rotor magnetic field. Thereby, force is applied to the upper frame 46 on which the stator winding 92 is mounted to rotate the frame 46 in the direction of the stator magnetic field movement.

An adjustable frequency three phase power supply 100 is provided for the swing motor 90 and has a power output connected to the motor 90 by phase lines A3, B3, and C3. The adjustable frequency power supply 100, in turn, receives power through the phase lines A1, B1 and C1 connected to the rings 76, 78 and 80. A controller 120 located in the operator's cab 44 is also connected through lines 124 and 126 to incoming power lines B1 and C1 and has an output control line 128 for directing the adjustable frequency power supply 120 and thereby controlling the swing movement of the upper assembly 2. The controller 120 includes a control lever 130 for operation of the controller by the operator in the cab 44. The adjustable frequency power supply 100 includes an inverter 102, a microcomputer 104 and an EPROM 106 all connected together by a bus 108. Information in digital signal form is transferred between the microcomputer 104, EPROM 106 and inverter 102 on the bus 32. The microcomputer 104 is also connected to the controller 120 by control line 128. The control line 128, although shown as a single line, represents a number of electrical connections between the microcomputer 104 and the controller 120 for transmitting information signals directing the microcomputer and the controller. The microcomputer 104 includes a microprocessor, a memory, and input and output units which are well known types of devices and are not shown, and which receive or transmit information on the bus 108 as well as the line 128 and process and convert from one form to another the information received to provide control instructions to the inverter 102, EPROM 106 and controller 120 for the operation of the swing motor 90.

The EPROM 106 contains a program for controlling the operation of the swing motor 90 in conjunction with signals received by the microcomputer 104 from the controller 120 and the inverter 102. The inverter 102 receives 3 phase 60 hertz A.C. power input from the lines A1, B1 and C1 as previously stated. The output of the inverter 102 on lines A3, B3 and C3 is a three phase A.C. selectively variable frequency power output to the stator winding 92 of the motor 90. The inverter 102 is of a well known type in which the three phase power input is rectified to full wave direct current power and then converted to three phase alternating current power output at a constant voltage to frequency ratio and at a frequency which may be varied and controlled by input signals from the microcomputer 102. The phase sequence of the alternating current power supply on lines A3, B3 and C3, which controls the direction of rotation of the swing motor 90 and thereby the upper assembly 2, is selected by an operator in the cab 44 and directed by a signal from the controller 120 to the microcomputer 104.

The lines 124 and 126 to the controller 120 connect to a transformer (not shown) within the controller 120 which provides low voltage alternating current for a DC power supply at a suitable DC voltage for the controller 120. The lever 130 of the controller can be moved by an operator to select the direction of the swing or rotation of the upper assembly 2, the frequency of the power output of the inverter 102 on lines A3, B3 and C3 and thereby the speed of the swing movement, and the stopping of the swing movement.

In operation, the main switch MS1 is closed to provide three phase 60 hertz power to the inverter 102. The operator moves the lever 130 to a position selecting the desired swing direction and the initial swing speed desired. As a result, a signal is transmitted on line 128 to the microcomputer 104. The microcomputer, in response to the incoming signal on line 128 and in accord with a program for the swing operation contained in EPROM 106, directs the inverter 102 to produce a frequency and phase sequence on the power supply phase lines A3, B3 and C3 to the swing motor 90 required to provide the swing direction and initial swing speed selected by the operator with lever 130. As the swing movement begins in the selected direction, the operator may further move the lever 130 to call for a speed increase in the swing movement and a resulting signal to the microcomputer will cause the microcomputer to direct higher frequency power from the inverter to the swing motor to increase the swing speed. Upon approaching the desired position of the upper assembly, the lever 130 can be moved to a stop position which will result in the microcomputer controlling the inverter to reverse the sequence of two of the output power phases of the inverter to, in effect, reverse the rotation direction of the swing motor 90. By reversing the sequence of two of the phases of the power supplied to the motor 90 until the motor and thereby the upper assembly are brought to a stop and then removing the power output on the phase lines to the motor from the inverter, the motor and upper assembly can be braked to a stop. At the new position at which it is desired to dig and lift material 20 in the dipper 10, the operator may lower the dipper 10 and move it into the material 20 with the assistance of the crowd mechanism 12. The dipper 10 then may be lifted by taking in the ropes 28. The operator may then again swing the upper assembly by manipulating the lever 130 to control the microcomputer and EPROM to direct the inverter to produce power to the swing motor 90 and cause swing movement of the upper assembly to a position at which it is desired to dump the material 20 from the dipper 10. At the latter location, the operator can operate the dipper 10 to dump the load of material and, following the dumping operation, the operator will again operate the lever 130 to provide power to the swing motor to move the upper assembly back to a digging position.

It will be understood that the foregoing description of the present invention is for purposes of illustration only and that the invention is susceptible to a number of modifications and changes, none of which entail any departure from the spirit and scope of the present invention as defined in the hereto appended claims.

What is claimed is:

1. An improvement in a surface mining shovel having a rotatable upper frame and a lower body stationary relative to the upper frame, the improvement comprising:

a source of three phase A.C. electrical power; and an A.C. motor having a plurality of rotor coils mounted on one of the upper frame and lower body and a plurality of stator coils connected to the electrical power source and mounted on the other of the upper frame and lower body whereby the motor rotates the upper frame and lower body relative to each other.

2. The improvement in accord with claim 1 further comprising support means having a circular track comprising part of the lower body and roller means engaging the circular track and upper frame for supporting the upper frame and the ones of the stator coils and rotor coils mounted on the upper frame in a rotatable manner along the track.

3. The improvement in accord with claim 1 wherein the rotor coils are mounted on the lower body and the stator coils are mounted on the rotatable upper frame.

4. The improvement in accord with claim 3 wherein:

the stator coils are rotatable about a substantially vertical axis; and the rotor coils are positioned radially outward of the stator coils from the vertical axis.

5. The improvement in accord with claim 3 wherein:

the lower body includes a circular track; and the plurality of stator coils and rotatable upper frame are movably supported on the circular track.

6. The improvement in accord with claim 5 further comprising roller means positioned between the circular track and the upper frame for supporting the upper frame and the stator coils as they move along the circular track.

7. The improvement in accord with claim 6 wherein the rotor coils are positioned between the roller means and the stator coils.

8. The improvement in accord with claim 6 wherein:

the source of three phase A.C. electrical power includes an inverter having a three phase power output connected to the motor such that a first rotating force is applied to rotate the upper frame and stator coils in a first direction; and further comprising means for controlling the inverter to change the sequence of occurrence of two of the three phases of the power output such that a second rotating force is applied in a direction opposite to the first rotating force to bring the rotation of the upper frame and stator coils to a stop.

9. An improvement in a surface mining shovel having an upper frame rotatable about a vertical axis, lower body stationary relative to the upper frame, the improvement comprising:

an A.C. motor including a stator winding and a rotor winding, the stator winding having a plurality of stator coils mounted on the upper frame and positioned along a first circle centered on the vertical axis, the rotor winding having a plurality of rotor coils mounted on the lower body radially opposite the plurality of stator coils; and an inverter having a three phase A.C. adjustable frequency power output connected to the stator winding whereby the motor operates to rotate the upper frame about the vertical axis relative to the stationary lower body.

10. The improvement in accord with claim 9 wherein:
- the inverter has a first sequence of the three phase A.C. power output resulting in a first direction of rotation of the upper frame and a second sequence of the three phase A.C. power output resulting in a second direction of rotation of the upper frame; and
- control means for selecting the sequence of the three phase A.C. power output and changing such selection during rotation in one of the first and second directions of the upper frame to stop the rotation.

11. The improvement in accord with claim 10 wherein the control means is operable to select the sequence of the three phase A.C. power output subsequent to the stopping of rotation of the upper frame to again cause rotation of the upper frame on one of the first and second directions.

12. The improvement in accord with claim 10 wherein the inverter is mounted on the rotatable upper frame.

13. The improvement in accord with claim 10 wherein the plurality of stator coils spaced apart from each other in a circumferential direction along the first circle and the plurality of rotor coils are spaced apart from each other in a circumferential direction along the second circle.

\* \* \* \* \*